United States Patent [19]

DeMartino et al.

[11] Patent Number: 4,666,454

[45] Date of Patent: May 19, 1987

[54] PRODUCTION OF A FABRIC CONTAINING POLYETHYLENE TEREPHTHALATE FIBERS HAVING A REDUCED TENDENCY TO PILL

[75] Inventors: Ronald N. DeMartino, Wayne, N.J.; Jeffrey T. Langley; Robert D. Johnson, both of Charlotte, N.C.

[73] Assignee: Celanese Corporation, New York, N.Y.

[21] Appl. No.: 773,765

[22] Filed: Sep. 9, 1985

[51] Int. Cl.$^4$ ............................................. C04B 41/30
[52] U.S. Cl. ........................................ 8/494; 8/130.1; 8/475; 8/497; 8/532; 8/922; 264/78
[58] Field of Search ..................... 8/115.54, 475, 494, 8/497, 130.1

[56] References Cited

U.S. PATENT DOCUMENTS

| | | | |
|---|---|---|---|
| 2,897,042 | 7/1959 | Heiks | 8/130.1 |
| 3,104,450 | 9/1963 | Christens et al. | 428/224 |
| 3,576,773 | 4/1971 | Vasinay | 8/533 |
| 3,580,874 | 5/1971 | Nishimura | 528/296 |
| 3,704,264 | 10/1973 | Bowers et al. | 8/636 |
| 3,991,035 | 11/1976 | Evans | 8/108 R |
| 4,004,878 | 1/1977 | Magosch et al. | 8/115.68 |
| 4,071,502 | 1/1978 | Sugiyama et al. | 528/272 |
| 4,103,051 | 7/1978 | Farmer | 8/196 |
| 4,359,557 | 11/1982 | Watkins et al. | 525/437 |
| 4,465,490 | 8/1984 | von der Eltz | 8/532 |

FOREIGN PATENT DOCUMENTS 779054 7/1957 United Kingdom .

OTHER PUBLICATIONS

"Man-Made Fibres" by R. W. Moncrieff, (Wiley, 1975), Sixth Edition, pp. 762–763.

Primary Examiner—A. Lionel Clingman
Attorney, Agent, or Firm—Burns, Doane, Swecker & Mathis

[57] ABSTRACT

A fabric comprising polyethylene terephthalate fibers which exhibits a reduced tendency to pill upon encountering surface abrasion is formed on an expeditious basis. During the polymerization of the monomers required to form the polyethylene terephthalate, a quantity of polyethylene glycol (as described) is copolymerized therewith to form a polymer which exhibits a substantial intrinsic viscosity (as described). Following the melt-extrusion of the polymer to form fibers and fabric formation, the fabric is subjected to a dye bath at an elevated temperature wherein it is dyed, and the intrinsic viscosity of the polymer is reduced (as described). The presence of units derived from polyethylene glycol within the polymer chain has been found to lead to such intrinsic viscosity reduction within the dye bath. Accordingly, the resulting polyethylene terephthalate fibers present in the fabric tend to exhibit a strength which is closer to that of natural fibers such as cotton, and the tendency of the fabric to retain undesirable pills is greatly reduced.

38 Claims, No Drawings

4,666,454

PRODUCTION OF A FABRIC CONTAINING POLYETHYLENE TEREPHTHALATE FIBERS HAVING A REDUCED TENDENCY TO PILL

BACKGROUND OF THE INVENTION

It generally is recognized that fabrics comprising synthetic polymeric fibers, such as polyethylene terephthalate fibers, have an undesirable propensity upon prolonged use to exhibit small compact groupings of entangled fibers (i.e., fuzz balls) on the fabric's surface. Such fiber groupings commonly are termed "pills" and tend to form and to tenaciously adhere to the surface of the fabric as the fabric encounters surface abrasion during normal use. The aesthetic appearance of the fabric accordingly may be adversely influenced by these relatively compact groupings of entangled fibers which are retained on the surface of the fabric.

Heretofore, it has been believed that such pills can be traced to the relatively high strength of the synthetic fibers present in the fabric. For instance, the pills may be more or less permanently attached to the fabric's surface by one or a few synthetic polymeric fibers extending out of the fabric which will resist breakage as surface abrasion continues. This theory of pill formation is supported by the general lack of the retention of undesirable fuzz balls on the surface of a fabric consisting solely of cotton fibers following the same surface abrasion conditions. It is believed, for instance, that any entangled cotton fibers which form at the surface of the fabric readily break away since the cotton fibers are of an inherently lesser strength.

This pilling problem may be observed in fabrics formed in whole or in part from polyethylene terephthalate fibers which are either in a staple or in a continuous configuration. Pills commonly are observed on fabrics formed from blends of cotton fibers and staple polyethylene terephthalate fibers following extended use. While the pills may be observed in fabrics having a wide variety of constructions, they frequently are observed on knitted fabrics which comprise polyethylene terephthalate fibers.

One approach heretofore proposed to reduce the tendency of the polyethylene terephthalate fibers to pill is initially to limit the intrinsic viscosity of the polyethylene terephthalate prior to fiber formation. Such reduced intrinsic viscosity provides a general indication of reduced polymeric chain length and leads to fibers having a lesser strength. Accordingly, when such entangled fibers become free on the surface of the fabric following abrasion, they tend to cleanly break away more readily and do not serve as a secure link which retains a fuzz ball at the surface of the fabric. It has been found, however, that when this approach is followed, it is more difficult initially to form and to process the polyethylene terephthalate fibers into a fabric using standard processing conditions because of their reduced strength. Such reduced strength can lead to premature fiber breakage with the concomitant processing disadvantages.

In U.S. Pat. Nos. 3,104,450; 3,576,773; 3,580,874; 3,607,804; 3,991,035; and 4,004,878 are proposed the incorporation of certain moieties in the backbone of polyethylene terephthalate fibers in an effort to improve pilling characteristics.

In U.S. Pat. Nos. 3,834,868 and 4,270,913 is proposed the degradation of previously formed polyethylene terephthalate fibers in an effort to reduce the propensity of the fibers to pill.

In U.S. Pat. Nos. 2,897,042; 4,071,502; and 4,359,557 are disclosed techniques for drawing or shrinking polyethylene terephthalate fibers under specified conditions in order to reduce the tendency to pill.

It is an object of the present invention to provide an improved process for the production of a fabric comprising polyethylene terephthalate fibers having a reduced tendency to pill and otherwise satisfactory performance characteristics.

It is an object of the present invention to provide an improved process for the production of a fabric comprising polyethylene terephthalate fibers having a reduced tendency to pill wherein the fibers can be melt-extruded and fabrics formed therefrom using conventional technology.

It is another object of the present invention to provide improved polyethylene terephthalate fibers having a reduced tendency to pill.

It is another object of the present invention to provide an improved process for the production of a dyed fabric comprising polyethylene terephthalate fibers having a reduced tendency to pill which can be carried out on a relatively economical basis.

It is a further object of the present invention to provide an improved polyethylene terephthalate fabric having a reduced tendency to pill wherein the polyethylene terephthalate fibers are more hydrophilic in nature which renders them more wettable and improves their stain release characteristics.

These and other objects, as well as the scope, nature, and utilization of the present invention will be apparent to those skilled in the art from the following detailed description and appended claims.

SUMMARY OF THE INVENTION

It has been found that an improved process for forming a fabric comprising polyethylene terephthalate fibers having a reduced tendency to pill comprises:

(a) polymerizing in a reaction zone at an elevated temperature monomers capable of forming polyethylene terephthalate in the presence of approximately 5 to 15 percent by weight of polyethylene glycol having a weight average molecular weight of approximately 200 to 20,000 based upon the weight of the monomer present therein which yields the terephthaloyl units of the polyethylene terephthalate with the polyethylene glycol being randomly copolymerized in the resulting polyethylene terephthalate polymer chains and the resulting polymer exhibiting an intrinsic viscosity of at least 0.46 deciliters per gram, (b) melt-extruding the resulting polymer through a plurality of extrusion orifices to form a multifilamentary fibrous material of the polymer, (c) forming a fabric which incorporates fibers of the multifilamentary fibrous material, and (d) subjecting the fabric to a dye bath provided at a temperature of approximately 90° to 160° C. for a time sufficient to dye the fabric and to reduce the intrinsic viscosity of fibers formed in step (b) to approximately 0.34 to 0.44 deciliters per gram, whereby the resulting dyed fabric exhibits a reduced tendency to pill upon encountering surface abrasion which is attributable to polymer chain degradation made possible in step (d) by the presence in the polymer chain of units derived from the polyethylene glycol.

DESCRIPTION OF PREFERRED EMBODIMENTS

The polymerization reaction in which monomers capable of forming polyethylene terephthalate are reacted is carried out at an elevated temperature and conveniently may be in accordance with any of the known polymerization techniques for such polymer. For instance, monomers capable of forming polyethylene terephthalate may be (a) dimethylterephthalate and ethylene glycol, or (b) terephthalic acid and ethylene glycol. In such instances, the dimethylterephthalate and the terephthalic acid monomers contribute terephthaloyl units to the resulting polymer. One or more standard polymerization catalysts such as zinc acetate, magnesium acetate, calcium acetate, antimony trioxide, tetrabutyl titanate, metal oxides, etc., preferably also are present during the polymerization reaction.

In accordance with the concept of the present invention, a minor concentration of polyethylene glycol having a weight average molecular weight of approximately 200 to 20,000 is randomly copolymerized within the chains of the polyethylene terephthalate polymer. For instance, units derived from polyethylene glycol of the appropriate chain length can be substituted for units derived from simple ethylene glycol. The polymerization reaction is allowed to proceed until the resulting polymer exhibits an intrinsic viscosity of at least 0.46 deciliters per gram (e.g., 0.50 to 0.65 deciliters per gram). The intrinsic viscosity is determined from a solution of 0.1 gram of polymer in 100 ml. of ortho-chlorophenol at 25° C.

The polyethylene glycol is provided in the reaction zone in a concentration of approximately 5 to 15 percent by weight based upon the weight of the monomer present therein which yields the terephthaloyl units of the polyethylene terephthalate (e.g., dimethylterephthalate or terephthalic acid). In a particularly preferred embodiment, the polyethylene glycol is provided in the reaction zone in a concentration of approximately 5 to 10 percent by weight based upon the monomer present therein which yields the terephthaloyl units of the polyethylene terephthalate. If the polyethylene glycol is provided in a concentration much below 5 percent by weight, then the beneficial results made possible through the practice of the concept of the present invention are substantially reduced. If the polyethylene glycol is provided in a concentration much above 15 percent by weight, then the physical properties (e.g., the tenacity) of the final product tend to be adversely influenced. Optionally, minor amounts of other moieties additionally may be copolymerized in the resulting polymer so long as they do not interfere with the accomplishment of the objectives of the present invention. For instance, minor amounts of diacids such as isophthalic acid, adipic acid, sulfoisophthalic acid, etc., may be substituted for approximately 1 to 10 percent by weight of the monomer which yields the terephthaloyl units of the polyethylene glycol. In such instance, the weight percent of polyethylene glycol additionally is based upon the weight of this optional diacid.

In a preferred embodiment, the polyethylene glycol which is provided in the reaction zone has a weight average molecular weight of approximately 1,000 to 2,000. In a particularly preferred embodiment, the polyethylene glycol which is provided in the reaction zone has a weight average molecular weight of approximately 1,400 to 1,600 (e.g. approximately 1,500). Suitable polyethylene glycols for use in the present invention are commercially available from the Union Carbide Corporation under the CARBOWAX polyethylene glycol designation.

The polyethylene terephthalate containing randomly copolymerized units derived from polyethylene glycol commonly exhibits a melting temperature of approximately 230° to 255° C. (e.g., approximately 245° C.). The lower melting temperatures commonly are associated with those polyethylene terephthalate polymers which incorporate units derived from polyethylene glycol in the greater concentrations within the range specified.

The resulting polymer is melt-extruded through a plurality of extrusion orifices to form a multifilamentary fibrous material. The polymer preferably is provided at a temperature approximately 10° to 50° C. above its melting temperature at the time of the melt-extrusion. For instance, the molten polymer preferably is provided at a temperature of approximately 250° to 290° C. (e.g., 260° C.), when extruded through the spinneret to form the multifilamentary fibrous material.

Conventional spinning apparatus commonly used to form fibers of polyethylene terephthalate conveniently may be selected. For instance, a standard spinneret having 500 to 2500 circular holes (e.g., 1400 circular holes) having a diameter of 8 to 20 mils (e.g., 9 to 12 mils) may be utilized in the process when forming staple yarns. Continuous filament yarns of approximately 20 to 50 filaments also conveniently are formed.

Subsequent to melt-extrusion through the spinneret, the resulting polymer is passed in the direction of its length through a solidification zone provided at a temperature below the polymer melting temperature wherein the molten multifilamentary material is transformed to a solid multifilamentary material. The solidification zone can also be termed a "quench zone." A gaseous atmosphere preferably is circulated within the solidification zone to bring about more efficient heat transfer. In a preferred embodiment of the process, the gaseous atmosphere of the solidification zone is provided at a temperature of approximately 80° to 120° F., and most preferably at approximately 100° F. The chemical composition of the gaseous atmosphere of the solidification zone is not critical to the operation of the process provided the gaseous atmosphere is not unduly reactive with the polymeric material. In a particularly preferred embodiment of the process the gaseous atmosphere of the solidification zone is air. Other representative gaseous atmospheres which may be selected for utilization in the solidification zone include inert gases such as helium, argon, nitrogen, etc.

The as-spun multifilamentary fibrous material next is preferably hot drawn as is common during the processing of polyethylene terephthalate fibers in order to increase the tenacity thereof. Drawing techniques commonly utilized with as-spun polyethylene terephthalate fibers can be employed. In a preferred embodiment, the multifilamentary fibrous material immediately prior to fabric formation exhibits a mean tenacity of at least 3.0 grams per denier, and most preferably a mean tenacity of at least approximately 3.25 grams per denier and an elongation to break of 25 to 45 percent. Accordingly, the multifilamentary fibrous material is of ample strength to readily be processed without difficulty to form a fabric while using conventional fabric-forming technology.

A fabric next is formed which incorporates the previously formed polyethylene terephthalate fibers having polyethylene glycol randomly copolymerized therein. During such fabric formation, the polymeric fibers can be present in either a staple or continuous filament yarn and conventional fabric-forming techniques can be utilized. The fabric construction can be widely varied. For instance, knitted or woven fabrics can be formed. In a preferred embodiment of the present invention, the polymeric fibers (heretofore described) initially are chopped into staple lengths and are blended with cotton fibers prior to fabric formation. For instance, approximately 1 to 99 percent by weight (e.g., approximately 30 to 70 percent by weight) of the polyethylene terephthalate fibers conveniently can be blended with cotton fibers based upon the total weight of the fiber blend. If desired, the polyethylene terephthalate fibers can be provided in differing staple lengths as described in commonly assigned U.S. Pat. Nos. 4,384,450 and 4,466,237. Conventional blending, carding, drafting, and yarn spinning techniques can be used to form the yarns used in the fabric formation. Also, in a preferred embodiment the resulting fabric can consist solely of the polyethylene terephthalate fibers discussed herein.

Prior to the dying treatment described hereafter, at least a portion of the resulting fabric may be converted into a garment using standard garment-forming constructions. For instance, shirts, blouses, stockings, dresses, etc., may be formed from the same.

During the dyeing treatment of the present invention, the fabric is subjected to a dye bath at an elevated temperature for a time sufficient to dye the fabric and to reduce the intrinsic viscosity of the polyethylene terephthalate fibers previously discussed to approximately 0.34 to 0.44 deciliters per gram. The intrinsic viscosity preferably is reduced to approximately 0.35 to 0.40 deciliters per gram. Such reduction in the intrinsic viscosity is made possible by the susceptibility of the polymer units derived from polyethylene glycol in the polymer chains to selectively degrade.

During the dyeing treatment, the dye bath is provided at a temperature of approximately 90° to 160° C., and preferably at a temperature of 100° to 130° C. In a preferred embodiment, the dye bath is aqueous in nature and is provided at a pH of approximately 3 to 5. Also, in a preferred embodiment, the dye bath is of the disperse dye type (e.g., of the anthraquinone or azo types) and is provided in an enclosed zone at superatmospheric pressure while such dyeing and intrinsic viscosity reduction are carried out. Representative residence times for the fabric in the dye bath commonly range from approximately 10 to 90 minutes, or more, (e.g., approximately 40 to 80 minutes). The longer residence times are commonly associated with the lower dye bath elevated temperatures, and the shorter residence times commonly are associated with the higher dye bath elevated temperatures. Dyebaths commonly used to dye conventional polyethylene terephthalate fibers may be selected. Representative disperse dyes which are suitable for use in the present invention are Yellow 23, Yellow 86, Red 60, Red 338, Blue 27, Blue 56, Blue 79, etc. Conventional dye carriers, dispersing agents, buffers, etc. commonly are used in conjunction with the dye dispersions while present in an aqueous medium.

The dyed fabrics formed in accordance with the concept of the present invention have been found to exhibit a substantially reduced tendency to pill when compared to similarly prepared fabrics comprising conventional polyethylene terephthalate fibers. Additionally, the other service qualities of the dyed fabrics of the present invention render them well suited for use in the usual textile applications without impairment. Such improved service characteristics are made possible as herein described on a relatively economical and expeditious basis.

The following example is given as a specific illustration of the claimed invention. It should be understood, however, that the specific details set forth in the example are merely illustrative and are not intended to act as a limitation on the scope of the present invention.

EXAMPLE

The polymerization reaction is carried out in a 5 gallon autoclave provided with a mechanical stirrer, gas inlet tube, vacuum fitting, and distillation head. Initially, the following are added to the reactor:

(a) 25 pounds of dimethylterephthalate,
(b) 18.04 pounds of ethylene glycol,
(c) 2.5 pounds of polyethylene glycol having a weight average molecular weight of approximately 1500,
(d) 0.036 pound of zinc acetate catalyst, and
(e) 0.008 pound of antimony trioxide catalyst.

The polyethylene glycol is purchased from the Union Carbide Corporation under the CARBOWAX 1500 polyethylene glycol designation. The polyethylene glycol is provided in the flask in a 10 percent by weight concentration based upon the weight of the dimethylterephthalate.

It is apparent from the reactants that a linear polymer will be formed upon polymerization.

The contents of the flask, while under a flowing atmosphere of nitrogen, are heated to 160° C. over a period of approximately 0.5 hour, after approximately 15 minutes at 160° C. the reaction begins as evidenced by distillate formation, the contents of the reactor are heated at 160° C. for another 0.5 hour, are heated to 180° C. over a period of 10 minutes, are heated at 180° C. for 1 hour, are heated to 200° C. in 10 minutes, are heated at 200° C. for 1 hour, are heated to 220° C. over a period of 10 minutes, and are heated at 220° C. for 0.5 hour. During this portion of the reaction bishydroxyethylterephthalate is formed and the methanol by-product is substantially removed through the distillation head. It is also during this portion of the reaction that the zinc acetate catalyst is operative. Next, 0.054 pound of triphenylphosphate is added to the autoclave with stirring in order to deactivate the zinc acetate catalyst and to thereby contribute to the quality of the ultimate product.

The contents of the autoclave next are heated to 250° C. over a period of 10 minutes, are maintained at 250° C. for a period of 30 minutes, are heated to approximately 280° C. over a period of 30 minutes, and are maintained at approximately 280° C. for 15 minutes with stirring. During this portion of the reaction, the bishydroxyethylterephthalate condenses to form polyethylene terephthalate with polymer units derived from polyethylene glycol being randomly copolymerized therein. The antimony trioxide catalyst is active during this portion of reaction.

Next, while at a temperature of approximately 280° C., the pressure within the autoclave is gradually reduced while stirring continues from approximately 760 mm. to less than 1 mm. over a period of 1 hour. The polyethylene glycol by-product is substantially removed through the distillation head and the molecular weight of the molten polymeric product is further increased. Finally, the vacuum is broken with nitrogen and the polymeric product is allowed to cool to room temperature (i.e., approximately 25° C.).

The resulting polyethylene terephthalate product containing units derived from polyethylene glycol randomly copolymerized therein is recovered and is found to exhibit an intrinsic viscosity (I.V.) of 0.50 deciliters per gram. The intrinsic viscosity is determined from a solution of 0.1 gram of polymer in 100 ml. of ortho-chlorophenol at 25° C. The melting temperature of the polymeric product is found to be approximately 245° C.

The polymeric product, while at a temperature of 260° C., is melt-extruded through a spinneret having 1400 circular holes of 9 mils diameter to form a multifilamentary fibrous material. The polymer throughput is 80 pounds per hour. Following quenching in flowing air supplied at 100° F., the multifilamentary fibrous material is taken up at a rate of 3000 feet per minute. The as-spun multifilamentary fibrous material exhibits a mean tenacity of approximately 1.5 grams per denier.

The multifilamentary fibrous material next is hot drawn on a draw frame in order to increase its mean tenacity to approximately 3.5 grams per denier. The resulting product also exhibits an elongation to break of approximately 35 percent.

The multifilamentary fibrous material next is chopped into lengths of approximately 1.5 inchs and is blended with cotton fibers in a weight ratio of polymeric material to cotton of 65:35. This blend is used to form a staple fiber yarn and subsequently is knitted to form a circular knit having a jersey construction. The fiber blend knits well using standard knitting technology.

Next, the fabric is subjected to a conventional disperse dye bath wherein the disperse dye is Blue 27. The dye bath has a pH of 4.5 and is provided in an enclosed vessel at superatmospheric pressure at a temperature of 130° C. with the knitted fabric being provided therein for a period of 75 minutes. Both the polyethylene terephthalate fibers and the cotton fibers become dyed and the inherent viscosity of the polyethylene terephthalate fibers is reduced to 0.40 deciliters per gram via degradation. Such degradation of the polyethylene terephthalate fibers in the dye bath is made possible by the presence therein of degradation susceptible units derived from polyethylene glycol. When the dyed fabric is subjected to prolonged surface abrasion, it exhibits no substantial tendency to form pills upon its surface.

For comparative purposes, when a similarly prepared fabric comprising polyethylene terephthalate fibers having an greater intrinsic viscosity of 0.50 deciliters per gram is subjected the same surface abrasion, substantial pilling is apparent upon the surface of the fabric.

The principles, preferred embodiments, and modes of operation of the present invention have been described in the foregoing specification. The invention which is intended to be protected herein, however, is not to be construed as limited to the particular forms disclosed, since these are regarded is illustrative rather than restrictive. Variations and modifications can be made by those skilled in the art without departing from the spirit of the invention.

We claim:

1. An improved process for forming a fabric comprising linear polyethylene terephthalate fibers having a reduced tendency to pill comprising:

(a) polymerizing in a reaction zone at an elevated temperature monomers capable of forming polyethylene terephthalate in the presence of approximately 5 to 15 percent by weight of polyethylene glycol having a weight average molecular weight of approximately 200 to 20,000 based upon the weight of the monomer present therein which yields the terephthaloyl units of said polyethylene terephthalate with said polyethylene glycol being randomly copolymerized in said resulting polyethylene terephthalate polymer chains and said resulting linear polymer exhibiting an intrinsic viscosity of at least 0.46 deciliters per gram, (b) melt-extruding the resulting polymer through a plurality of extrusion orifices to form a multifilamentary fibrous material of said polymer, (c) forming a fabric which incorporates fibers of said multifilamentary fibrous material, and (d) subjecting said fabric to a dye bath provided at a temperature of approximately 90° to 160° C. for a time sufficient to dye said fabric and to reduce the intrinsic viscosity of fibers formed in step (b) to approximately 0.34 to 0.44 deciliters per gram, whereby the resulting dyed fabric exhibits a reduced tendency to pill upon encountering surface abrasion which is attributable to polymer chain degradation made possible in step (d) by the presence in the polymer chain of units derived from said polyethylene glycol.

2. An improved process for forming a fabric comprising polyethylene terephthalate fibers having a reduced tendency to pill according to claim 1 wherein said monomers capable of forming polyethylene terephthalate which are provided in step (a) are dimethylterephthalate and ethylene glycol.

3. An improved process for forming a fabric comprising polyethylene terephthalate fibers having a reduced tendency to pill according to claim 1 wherein said monomers capable of forming polyethylene terephthalate which are provided in step (a) are terephthalic acid and ethylene glycol.

4. An improved process for forming a fabric comprising polyethylene terephthalate fibers having a reduced tendency to pill according to claim 1 wherein said polyethylene glycol is provided in a said reaction zone in step (a) in a concentration of approximately 5 to 10 percent by weight based upon the weight of monomer present in the reaction zone which yields the terephthaloyl units of said polyethylene terephthalate.

5. An improved process for forming a fabric comprising polyethylene terephthalate fibers having a reduced tendency to pill according to claim 1 wherein said polyethylene glycol provided in said reaction zone in step (a) has a weight average molecular weight of approximately 1,000 to 2,000.

6. An improved process for forming a fabric comprising polyethylene terephthalate fibers having a reduced tendency to pill according to claim 1 wherein said polyethylene glycol provided in said reaction zone in step (a) has a weight average molecular weight of approximately 1,400 to 1,600.

7. An improved process for forming a fabric comprising polyethylene terephthalate fibers having a reduced tendency to pill according to claim 1 wherein said polymer formed in step (a) has an intrinsic viscosity of 0.50 to 0.65 deciliters per gram.

8. An improved process for forming a fabric comprising polyethylene terephthalate fibers having a reduced tendency to pill according to claim 1 wherein the extrusion orifices employed in step (b) number approximately 500 to 2500.

9. An improved process for forming a fabric comprising polyethylene terephthalate fibers having a reduced tendency to pill according to claim 1 wherein the fibers following melt-extrusion and solidification in step (b) are drawn to increase the tenacity thereof.

10. An improved process for forming a fabric comprising polyethylene terephthalate fibers having a reduced tendency to pill according to claim 1 wherein said multifilamentary fibrous material exhibits a mean tenacity of at least 3.0 grams per denier immediately prior to fabric formation in step (c).

11. An improved process for forming a fabric comprising polyethylene terephthalate fibers having a reduced tendency to pill according to claim 1 wherein said multifilamentary fibrous material is present in a staple yarn when incorporated in said fabric in step (c).

12. An improved process for forming a fabric comprising polyethylene terephthalate fibers having a reduced tendency to pill according to claim 1 wherein said multifilamentary fibrous material is present in a staple yarn and is blended with cotton fibers when incorporated in said fabric in step (c).

13. An improved process for forming a fabric comprising polyethylene terephthalate fibers having a reduced tendency to pill according to claim 1 wherein said fabric formed in step (c) is a knitted fabric.

14. An improved process for forming a fabric comprising polyethylene terephthalate fibers having a reduced tendency to pill according to claim 1 wherein said fabric formed in step (c) is a woven fabric.

15. An improved process for forming a fabric comprising polyethylene terephthalate fibers having a reduced tendency to pill according to claim 1 wherein at least a portion of said fabric is formed into a garment immediately prior to said dyeing step (d).

16. An improved process for forming a fabric comprising polyethylene terephthalate fibers having a reduced tendency to pill according to claim 1 wherein said dye bath employed in step (d) is a disperse dye bath provided at superatmospheric pressure.

17. An improved process for forming a fabric comprising polyethylene terephthalate fibers having a reduced tendency to pill according to claim 1 wherein said dye bath employed in step (d) is provided at a temperature of approximately 100° to 130° C.

18. An improved process for forming a fabric comprising polyethylene terephthalate fibers having a reduced tendency to pill according to claim 1 wherein said dye bath employed in step (d) exhibits a pH of approximately 3 to 5.

19. An improved process for forming a fabric comprising polyethylene terephthalate fibers having a reduced tendency to pill according to claim 1 wherein said polymer has a reduced intrinsic viscosity of approximately 0.35 to 0.40 deciliters per gram following step (d).

20. An improved fabric comprising polyethylene terephthalate fibers having a reduced tendency to pill formed by the process of claim 1.

21. An improved process for forming a fabric comprising polyethylene terephthalate fibers having a reduced tendency to pill according to claim 1 wherein in step (d) said fabric is subjected to said dye bath provided at a temperature of approximately 90° to 160° C. for a time within the range of approximately 10 to 90 minutes which is sufficient to dye said fabric and to reduce the intrinsic viscosity of the fibers formed in step (b) to approximately 0.34 to 0.44 deciliters per gram.

22. An improved process for forming a fabric comprising polyethylene terephthalate fibers having a reduced tendency to pill according to claim 1 wherein in step (d) said fabric is subjected to said dye bath provided at a temperature of approximately 90° to 160° C. for a time within the range of approximately 40 to 80 minutes which is sufficient to dye said fabric and to reduce the intrinsic viscosity of the fibers formed in step (b) to approximately 0.34 to 0.44 deciliters per gram.

23. An improved process for forming a fabric comprising polyethylene terephthalate fibers having a reduced tendency to pill according to claim 21 wherein in step (d) said fabric is subjected to said dye bath provided at superatmospheric pressure at a temperature of approximately 100° to 130° C. for a time within the range of approximately 40 to 80 minutes which is sufficient to dye said fabric and to reduce the intrinsic viscosity of the fibers formed in step (b) to approximately 0.35 to 0.40 deciliters per gram.

24. An improved process for forming a fabric comprising linear polyethylene terephthalate fibers having a reduced tendency to pill comprising:
   (a) polymerizing in a reaction zone at an elevated temperature dimethylterephthalate and ethylene glycol monomers capable of forming polyethylene terephthalate in the presence of approximately 5 to 10 percent by weight of polyethylene glycol having a weight average molecular weight of approximately 1,000 to 2,000 based upon the weight of dimethylterephthalate monomer present in the reaction zone with said polyethylene glycol being randomly copolymerized in said resulting polyethylene terephthalate polymer chains and said resulting linear polymer exhibiting an intrinsic viscosity of 0.50 to 0.65 deciliters per gram,
   (b) melt-extruding the resulting polymer through a plurality of extrusion orifices to form a multifilamentary fibrous material of said polymer,
   (c) forming a fabric which incorporates fibers of said multifilamentary fibrous material, and
   (d) subjecting said fabric to a dye bath provided at a superatmospheric pressure at a temperature of approximately 100° to 130° C. for a time within the range of approximately 10 to 90 minutes sufficient to dye said fabric and to reduce the intrinsic viscosity of fibers formed in step (b) to approximately 0.34 to 0.44 deciliters per gram,
whereby the resulting dyed fabric exhibits a reduced tendency to pill upon encountering surface abrasion which is attributable to polymer chain degradation made possible in step (d) by the presence in the polymer chain of units derived from said polyethylene glycol.

25. An improved process for forming a fabric comprising polyethylene terephthalate fibers having a reduced tendency to pill according to claim 24 wherein said polyethylene glycol provided in said reaction zone in step (a) has a weight average molecular weight of approximately 1,400 to 1,600.

26. An improved process for forming a fabric comprising polyethylene terephthala fibers having a reduced tendency to pill according to claim 24 wherein the extrusion orifices employed in step (b) number approximately 20 to 50.

27. An improved process for forming a fabric comprising polyethylene terephthalate fibers having a reduced tendency to pill according to claim 24 wherein the fibers following melt extrusion and solidification in step (b) are drawn to increase the tenacity thereof.

28. An improved process for forming a fabric comprising polyethylene terephthalate fibers having a reduced tendency to pill according to claim 24 wherein said multifilamentary fibrous material exhibits a mean tenacity of at least 3.0 grams per denier immediately prior to fabric formation in step (c).

29. An improved process for forming a fabric comprising polyethylene terephthalate fibers having a reduced tendency to pill according to claim 24 wherein said multifilamentary fibrous material is present in a staple yarn when incorporated in said fabric in step (c).

30. An improved process for forming a fabric comprising polyethylene terephthalate fibers having a reduced tendency to pill according to claim 24 wherein said multifilamentary fibrous material is present in a staple yarn and is blended with cotton fibers when incorporated in said fabric in step (c).

31. An improved process for forming a fabric comprising polyethylene terephthalate fibers having a reduced tendency to pill according to claim 24 wherein said fabric formed in step (c) is a knitted fabric.

32. An improved process for forming a fabric comprising polyethylene terephthalate fibers having a reduced tendency to pill according to claim 24 wherein said fabric formed in step (c) is a woven fabric.

33. An improved process for forming a fabric comprising polyethylene terephthalate fibers having a reduced tendency to pill according to claim 24 wherein at least a portion of said fabric is formed into a garment immediately prior to said dyeing step (d).

34. An improved process for forming a fabric comprising polyethylene terephthalate fibers having a reduced tendency to pill according to claim 24 wherein said dye bath employed in step (d) is a disperse dye bath provided at superatmospheric pressure.

35. An improved process for forming a fabric comprising polyethylene terephthalate fibers having a reduced tendency to pill according to claim 24 wherein said dye bath employed in step (d) is provided at a temperature of approximately 100° to 130° C.

36. An improved process for forming a fabric comprising polyethylene terephthalate fibers having a reduced tendency to pill according to claim 24 wherein said dye bath employed in step (d) exhibits a pH of approximately 3 to 5.

37. An improved process for forming a fabric comprising polyethylene terephthalate fibers having a reduced tendency to pill according to claim 24 wherein said polymer has a reduced intrinsic viscosity of approximately 0.35 to 0.40 deciliters per gram following step (d).

38. An improved fabric comprising polyethylene terephthalate fibers having a reduced tendency to pill formed by the process of claim 24.

* * * * *